United States Patent
Rawlings et al.

(10) Patent No.: US 9,156,403 B2
(45) Date of Patent: Oct. 13, 2015

(54) MIRROR MOUNTING ASSEMBLY WITH ADAPTER

(75) Inventors: Donald S. Rawlings, Caledonia, MI (US); Vernon R. Nise, Caledonia, MI (US); David K. Willmore, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 1168 days.

(21) Appl. No.: 13/151,602

(22) Filed: Jun. 2, 2011

(65) Prior Publication Data
US 2011/0299185 A1    Dec. 8, 2011

Related U.S. Application Data

(60) Provisional application No. 61/351,377, filed on Jun. 4, 2010.

(51) Int. Cl.
*B60R 1/04* (2006.01)
*G02B 7/182* (2006.01)

(52) U.S. Cl.
CPC . *B60R 1/04* (2013.01); *G02B 7/182* (2013.01); *Y10T 29/4973* (2015.01)

(58) Field of Classification Search
CPC ................................. G02B 7/182; B60R 1/04
USPC ........ 359/871; 358/872; 248/549, 475.1, 476, 248/479
See application file for complete search history.

(56) References Cited

U.S. PATENT DOCUMENTS

| | | |
|---|---|---|
| 3,036,803 A | 5/1962 | Fiebelkorn |
| 3,074,680 A | 1/1963 | Stewart |
| 3,131,251 A | 4/1964 | Ryan |
| 3,189,187 A | 6/1965 | Guyer, Jr. et al. |
| 3,211,409 A | 10/1965 | Zimmermann |
| 3,237,898 A | 3/1966 | Goss |
| 3,367,616 A | 2/1968 | Bausch et al. |
| 3,436,049 A | 4/1969 | De Claire et al. |
| 3,498,579 A | 3/1970 | Vicary |
| 3,499,744 A | 3/1970 | Tolliver |
| 3,504,878 A | 4/1970 | Dressler |
| 3,554,582 A | 1/1971 | Yamashita et al. |
| 3,589,662 A | 6/1971 | Lagrange |
| 3,596,867 A | 8/1971 | Allander |
| 3,599,926 A | 8/1971 | Takahashi |
| 3,612,469 A | 10/1971 | Dennis |
| 3,631,572 A | 1/1972 | Lange |
| 3,635,435 A | 1/1972 | Perison, Sr. |
| 3,703,270 A | 11/1972 | Tomlin |

(Continued)

*Primary Examiner* — Ricky D Shafer
(74) *Attorney, Agent, or Firm* — Gardner, Linn, Burkhart & Flory, LLP

(57) ABSTRACT

An interior mounting system for a vehicle includes an interior assembly, a mounting assembly for mounting the interior assembly at a vehicle windshield, a first windshield mounting element adhered to an in-cabin surface of the vehicle windshield, and a second windshield mounting element attached at the in-cabin surface of the vehicle windshield and at or at least partially around the first mounting element. A mounting base of the mounting assembly is configured to engage at least the second mounting element when the mounting base is mounted at the first and second mounting elements at the in-cabin surface of the vehicle windshield. The first and second mounting elements cooperate to support the mounting base and the interior assembly when the first and second mounting elements are adhered to the in-cabin surface of the vehicle windshield and when the mounting base is mounted at the first and second mounting elements.

11 Claims, 5 Drawing Sheets

(56) References Cited

U.S. PATENT DOCUMENTS

| | | |
|---|---|---|
| 3,756,637 A | 9/1973 | Wildi |
| 3,848,843 A | 11/1974 | Levy |
| 3,887,156 A | 6/1975 | Hugonnier |
| 3,913,876 A | 10/1975 | McSherry |
| 3,928,894 A | 12/1975 | Bury et al. |
| 4,012,022 A | 3/1977 | Tomita |
| 4,027,436 A | 6/1977 | Daly |
| 4,059,360 A | 11/1977 | Teissier |
| 4,071,217 A | 1/1978 | Kongelka |
| 4,105,296 A | 8/1978 | Tomlin |
| 4,113,217 A | 9/1978 | O'Connell |
| 4,127,911 A | 12/1978 | Cupp et al. |
| 4,234,153 A | 11/1980 | Chihara et al. |
| 4,253,633 A | 3/1981 | Takegawa |
| 4,254,931 A | 3/1981 | Aikens et al. |
| 4,283,038 A | 8/1981 | Kurtz |
| 4,284,367 A | 8/1981 | Tuson et al. |
| 4,346,868 A | 8/1982 | Lindner |
| 4,382,572 A | 5/1983 | Thompson |
| 4,394,066 A | 7/1983 | Sharp |
| 4,422,212 A | 12/1983 | Sheiman et al. |
| 4,436,273 A | 3/1984 | Yuda et al. |
| 4,455,692 A | 6/1984 | Hegge et al. |
| 4,524,941 A | 6/1985 | Wood et al. |
| 4,579,309 A | 4/1986 | Fujiwara et al. |
| 4,592,529 A | 6/1986 | Suzuki |
| 4,593,878 A | 6/1986 | Stewart |
| 4,626,086 A | 12/1986 | Ohyama |
| 4,626,087 A | 12/1986 | Ohyama |
| 4,632,348 A | 12/1986 | Keesling et al. |
| 4,645,316 A | 2/1987 | Ohyama |
| 4,668,059 A | 5/1987 | Ohyama |
| 4,759,620 A | 7/1988 | Sakuma et al. |
| 4,776,624 A | 10/1988 | Sakuma et al. |
| 4,919,525 A | 4/1990 | Gilbert |
| 4,930,742 A | 6/1990 | Schofield et al. |
| 4,936,533 A | 6/1990 | Adams et al. |
| RE33,249 E | 7/1990 | Schneider |
| 4,948,085 A | 8/1990 | Mittelhäuser |
| 4,995,581 A | 2/1991 | Koiwai et al. |
| 5,058,851 A | 10/1991 | Lawlor et al. |
| 5,100,095 A | 3/1992 | Haan et al. |
| 5,151,828 A * | 9/1992 | Sugimura ............ 359/871 |
| 5,160,780 A | 11/1992 | Ono et al. |
| 5,330,149 A | 7/1994 | Haan et al. |
| 5,356,105 A | 10/1994 | Andrews |
| 5,377,948 A | 1/1995 | Suman et al. |
| 5,377,949 A | 1/1995 | Haan et al. |
| 5,439,305 A | 8/1995 | Santo |
| 5,587,236 A | 12/1996 | Agrawal et al. |
| 5,820,097 A | 10/1998 | Spooner |
| 5,931,440 A * | 8/1999 | Miller ............ 248/549 |
| 6,202,976 B1 * | 3/2001 | Johnson et al. ......... 248/476 |
| 7,510,287 B2 * | 3/2009 | Hook ............ 359/872 |
| 7,712,810 B2 * | 5/2010 | Tanaka et al. ......... 296/1.11 |
| 7,717,394 B2 * | 5/2010 | Tanaka et al. ......... 248/549 |
| 8,454,178 B2 * | 6/2013 | Carnevali ............ 359/871 |

* cited by examiner

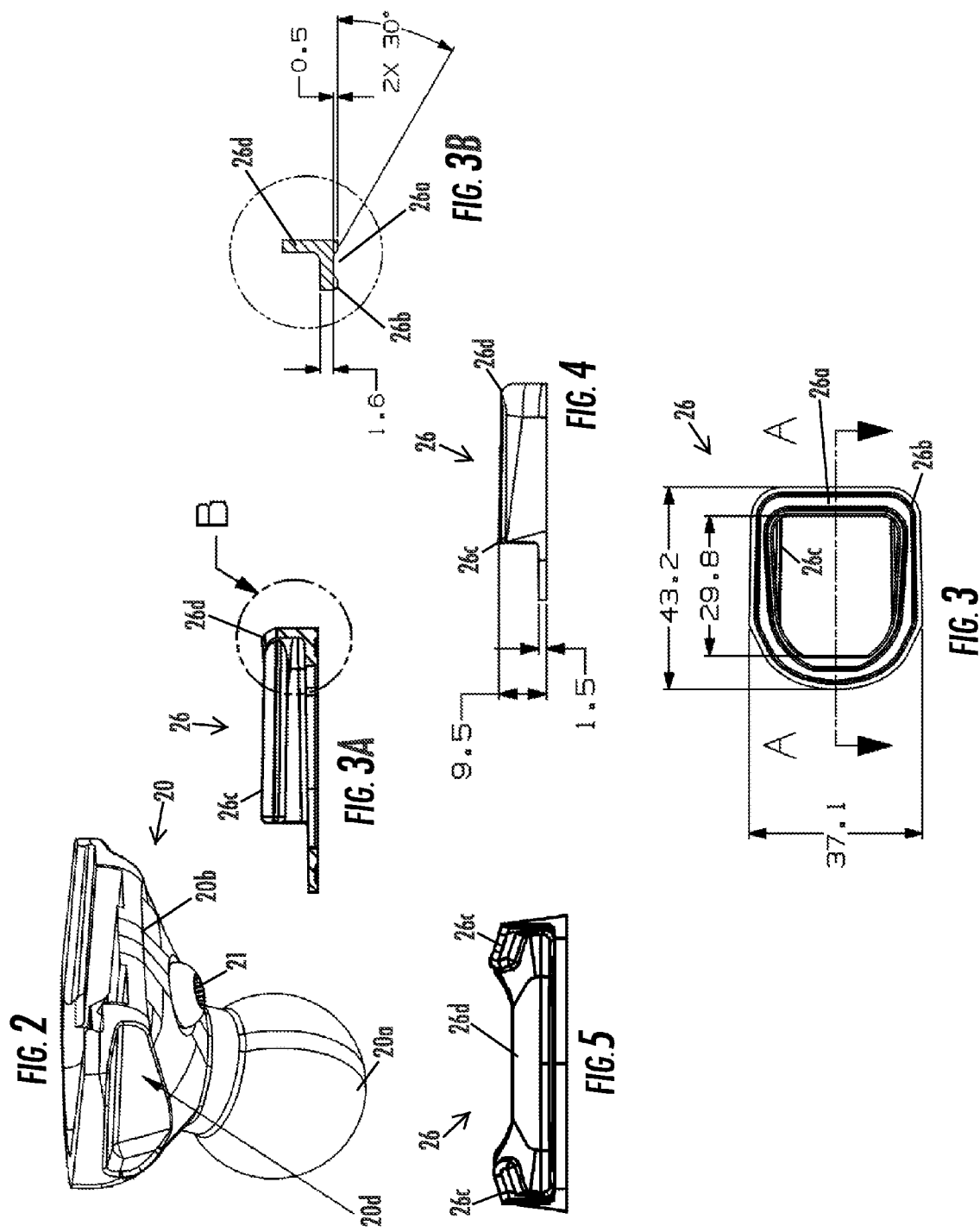

MIRROR MOUNTING ASSEMBLY WITH ADAPTER

CROSS REFERENCE TO RELATED APPLICATION

The present application claims the filing benefit of U.S. provisional application Ser. No. 61/351,377, filed Jun. 4, 2010, which is hereby incorporated herein by reference in its entirety.

FIELD OF THE INVENTION

The present invention relates generally to the field of rearview mirror assemblies for vehicles and, more particularly, to an interior rearview mirror assembly that is adjustably mounted at an interior portion of a vehicle.

BACKGROUND OF THE INVENTION

It is known to provide a mirror assembly that is adjustably mounted to an interior portion of a vehicle, such as via a double ball pivot joint or double ball pivot mounting configuration where the mirror casing and reflective element are adjusted relative to the interior portion of a vehicle by pivotal movement about the double ball pivot arm or configuration. The mirror casing and reflective element are pivotable about either ball pivot joint or ball joint by a user that is adjusting a rearward field of view of the reflective element. In some applications, a mirror assembly may be adjustably mounted to an interior portion of a vehicle via a single ball pivot joint or single pivot mounting configuration. Typically, a base portion or channel mount of the mirror mounting assembly is mounted to or attached to a windshield mounting button that is adhered to an in-cabin surface of the windshield of the vehicle.

SUMMARY OF THE INVENTION

The present invention provides a mounting adapter for an interior rearview mirror assembly adjustably mounted to an interior portion of a vehicle via a mounting configuration that allows a user (such as the driver of the vehicle equipped with the mirror assembly) to adjust a rearward field of view of the reflective element via pivotal adjustment of the mirror casing and reflective element about a pivot joint or ball pivot joint and relative to a mounting base or channel mount attached or mounted at a windshield mounting element or button attached to the windshield of the vehicle. The windshield mounting button is typically adhered to the in-cabin surface of the vehicle windshield, and the channel mount slides along the mounting button to receive the mounting button in the channels of the channel mount to attach the mirror assembly to the mounting button. The mounting adapter of the present invention is adhered to the in-cabin surface of the vehicle windshield at least partially around the periphery of the mounting button, whereby the mounting base attaches to both the mounting button and to the mounting adapter (such as by receiving portions of the mounting button in channels of the mounting base or channel mount and by having portions of the mounting base or channel mount received in channels or slots of the mounting adapter), thereby increasing the attachment interface or bonding area between the mirror mounting base and the in-cabin surface of the vehicle windshield. Thus, the present invention allows for a larger, heavier mirror assembly (such as a mirror assembly with increased electrical content and the like) to replace a smaller, base-line mirror assembly without having to replace the windshield mounting button with a larger windshield mounting button.

According to an aspect of the present invention, an interior rearview mirror mounting system for a vehicle includes an interior assembly (such as an interior rearview mirror assembly comprising a mirror casing and a reflective element disposed at the mirror casing), and a mounting assembly for adjustably mounting the interior assembly at a windshield of a vehicle that is equipped with the interior assembly. A first windshield mounting element is attached at or adhered to an in-cabin surface of the windshield of the equipped vehicle and a second windshield mounting element is attached at or adhered to the in-cabin surface of the windshield of the equipped vehicle and at least partially around the first windshield mounting element. The mounting assembly comprises a mounting base, and the interior assembly is supported at the windshield by the mounting base and may be adjustable relative to the mounting base. The mounting base is configured to engage at least the second windshield mounting element (and may engage both of the first and second windshield mounting elements) when the mounting base is mounted at the first and second mounting elements at the in-cabin surface of the windshield of the equipped vehicle. The first and second mounting elements cooperate to support the mounting base and the interior assembly when the first and second mounting elements are adhered to the in-cabin surface of the windshield of the equipped vehicle and when the mounting base is mounted at the first and second mounting elements.

Optionally, the first mounting element may comprise a mounting button (such as a mirror mounting button) and the second mounting element may comprise a ring-shaped mounting element that at least partially circumscribes the mounting button. The mounting base may include at least one first channel for receiving at least a portion of the mounting button and at least one second channel for receiving a portion of the ring-shaped mounting element. The at least one first channel may be formed along a windshield facing portion of the mounting base that faces the windshield of the equipped vehicle when the mounting base is mounted at the windshield of the equipped vehicle, and the at least one second channel may be formed along an outer portion of the mounting base that faces away from the windshield of the equipped vehicle when the mounting base is mounted at the windshield of the equipped vehicle.

According to another aspect of the present invention, a method of replacing an interior assembly includes removing a first interior assembly (such as a first interior rearview mirror assembly or accessory module or rain sensor or navigation system or satellite radio antenna and/or the like) from a vehicle by detaching a first mounting base of the first interior assembly from a first mounting element attached at or adhered or bonded to an in-cabin surface of the windshield of the vehicle. A second mounting element is provided and attached at or adhered or bonded to the in-cabin surface of the vehicle windshield at or near or around the first mirror mounting element. A second mounting base of a second interior assembly is mounted at the first and second mounting elements, whereby the first and second mounting elements cooperate to support the second interior assembly at the vehicle windshield.

Thus, the present invention provides an interior assembly (such as, for example, an interior rearview mirror assembly or windshield mounted accessory module or accessory or system) for a vehicle or mounting system for mounting an interior assembly at a vehicle windshield. The interior assembly includes a mounting assembly or configuration for mounting the interior assembly at an interior portion of a vehicle. The mounting configuration comprises a mounting base that is attachable to a mounting element at an interior portion of a vehicle, with a mounting element or portion (such as a ball member or socket or the like of a mirror mounting configuration) adjustably or pivotally mounted at a pivot joint. The mounting element comprises a first windshield mounting element or button that is adhered to the in-cabin surface of the vehicle windshield, and a second or peripheral windshield mounting element or ring-shaped element that is adhered to the in-cabin surface of the vehicle windshield at least partially around the periphery of the first windshield mounting button. The mounting base is configured to attach to both the first and second mounting elements to attach or mount the mounting base at the vehicle windshield, whereby the mounting elements cooperate to provide an enhanced surface area of adhesion to the in-cabin surface of the vehicle windshield.

Therefore, the present invention provides a mounting adapter that adapts the bonding surface area or the effective bonding area or size of a mirror mounting button so as to allow for a larger or heavier mirror assembly (or other interior assembly or accessory module or windshield mounted accessory or system or the like) to be mounted at a windshield surface that already has a smaller mounting button (such as a mounting button for a base mirror or prismatic mirror with reduced electrical content) attached thereto. Thus, a user or owner of a vehicle can replace the base mirror with an upgrade mirror (such as a mirror with enhanced or increased electronic content, such as electrochromic circuitry, telematics features, video display or other display features and/or the like) by removing the base mirror (from the base or smaller mounting button) and adding or adhering the mounting adapter at or at least partially around the mounting button and then mounting the upgraded heavier mirror assembly to the mounting configuration that comprises both the original smaller mounting button and the mounting adapter. When so mounted, the channel mount or base portion of the mirror assembly attaches to and is supported by both the mounting button and mounting adapter, such that the mounting button and mounting adapter cooperate to provide a larger bonding surface area at the mounting button-windshield surface interface.

These and other objects, advantages, purposes and features of the present invention will become apparent upon review of the following specification in conjunction with the drawings.

BRIEF DESCRIPTION OF THE DRAWINGS

FIG. 2 is a perspective view of the mounting base or channel mount of the interior rearview mirror assembly of FIG. 1;

FIG. 3 is a plan view of the mounting adapter for use with the mounting base and interior rearview mirror assembly of FIGS. 1 and 2 in accordance with the present invention;

FIG. 3A is a sectional view of the mounting adapter taken along the line A-A in FIG. 3;

FIG. 3B is an enlarged sectional view of the region B in FIG. 3A;

FIG. 4 is a side elevation of the mounting adapter of FIG. 3;

FIG. 5 is an end elevation of the mounting adapter of FIGS. 3 and 4;

DESCRIPTION OF THE PREFERRED EMBODIMENTS

Figure 1:
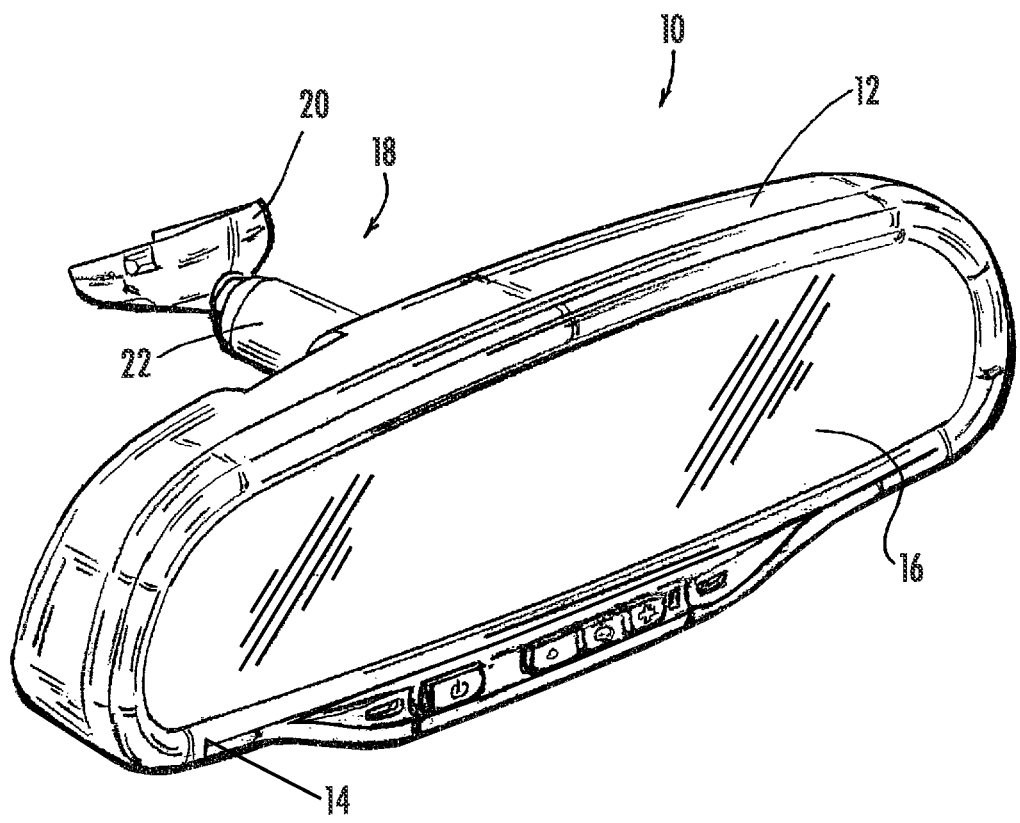
FIG. 1 is a perspective view of an interior rearview mirror assembly and mounting structure in accordance with the present invention.

Referring now to the drawings and the illustrative embodiments depicted therein, an interior rearview mirror assembly 10 for a vehicle includes a casing 12, a bezel portion 14 and a reflective element 16 positioned at and at least partially within the casing and/or bezel portion (FIG. 1). Mirror assembly 10 is adjustably mounted at an interior portion of a vehicle (such as at an interior surface of a vehicle windshield or a headliner of a vehicle or the like) via a double ball pivot mounting configuration or assembly 18. Mounting assembly 18 includes a base portion or mounting base or breakaway stay or channel mount 20 and a mounting arm 22. The mounting base 20 is configured to be mounted to a windshield mounting element or button 24 (FIGS. 9, 10 and 12-14) and a mounting adapter 26 (FIGS. 3-14) adhered or attached to an in-cabin surface of the vehicle windshield, as discussed below. The mounting button 24 and mounting adapter 26 cooperate to provide enhanced attachment strength or bond strength to the in-cabin surface of the vehicle windshield, such as for replacing a base prismatic mirror assembly with an electro-optic mirror assembly (such as an electrochromic mirror assembly or liquid crystal mirror assembly or the like). Although shown and described as providing a mounting adapter to support a larger or heavier mirror assembly at the in-cabin surface of the vehicle windshield, the mounting system and method of the present invention may be equally suited for adaptation of the mounting system for other interior assemblies or systems, such as other windshield mounted interior assemblies or windshield electronics modules or accessory modules or rain sensors or navigation systems or antennae, such as a satellite radio antenna or the like, or other devices or accessories or systems, while remaining within the spirit and scope of the present invention.

In the illustrated embodiment, the reflective element 16 and mirror casing 12 of the interior rearview mirror assembly are pivotally mounted at outer or rearward or mirror end of mounting arm 22 about a mirror ball pivot joint (such as a ball and socket joint or the like that allows for a driver of the vehicle to which mirror assembly 10 is mounted to adjust the reflective element vertically and horizontally to adjust the rearward field of view of the driver). The opposite or forward or base end of mounting arm 22 is adjustably mounted to mounting base 20 about a second or adjustable or base joint, such as at a ball portion 20a of mounting base 20, which allows for vertical and horizontal adjustment of the reflective element 16. Mounting base 20 is attached to an in-cabin surface of the vehicle windshield via mounting button or attachment element 24 and adapter 26, which may be adhered or bonded to the interior surface of the vehicle windshield (such as by utilizing aspects of the mounting systems described in U.S. Pat. No. 5,587,236, which is hereby incorporated herein by reference in its entirety), and extends downwardly from the attachment location. The mounting base may be mounted to a mounting button or attachment element at the vehicle windshield via a breakaway mounting construction, such as by utilizing aspects of the mounting constructions described in U.S. Pat. Nos. 5,820,097 and/or 5,100,095, which are hereby incorporated herein by reference in their entireties. Although shown and described as a double ball or double pivot mounting arrangement, aspects of the present invention may be used in a single ball or single pivot mounting arrangement and/or in other adjustable mounting arrangements, such as the types described in PCT Application No. PCT/US2010/028130, filed Mar. 22, 2010 and published Sep. 30, 2010 as International Publication No. WO 2010/111173, which is hereby incorporated herein by reference in its entirety. Mounting arm 22 and/or base portion 20 may comprise molded (such as injection molded) polymeric components or may be otherwise formed, depending on the particular application of the mirror assembly (and may utilize aspects of the mounting assemblies described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860; and/or 6,483,438, and/or U.S. patent application Ser. No. 11/226,628, filed Sep. 14, 2005 and published Mar. 23, 2006 as U.S. Publication No. US-2006-0061008, which are hereby incorporated herein by reference in their entireties).

As shown in FIGS. 3-8, adapter 26 comprises a generally ring shaped element that is formed to circumscribe or surround a typical mirror mounting button (such as mounting button 24). Adapter 26 includes an adhesive channel or bonding region 26a disposed around a perimeter of adapter 26 to provide a recess or channel for receiving adhesive (such as an epoxy or other suitable adhesive or bonding agent) therein, and with outer lips or edges 26b at either side of the recess or channel 26a to provide the desired or appropriate bond-line thickness or spacing between the windshield and the adhesive channel or recess. Adapter includes a pair of side arms or tabs 26c that extend from the bonding region or channel 26a and radially inward (such as shown in FIG. 5), and an end lip or tab 26d at the lower end of the adapter 26, whereby the tabs 26c and lip 26d function to receive mounting base 20 therein to secure mounting base 20 relative to adapter 26.

Figure 6:
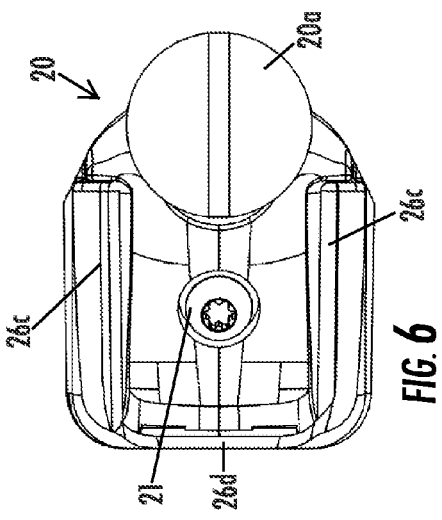
FIG. 6 is a top plan view of the mounting base attached to the mounting adapter in accordance with the present invention.
Figure 7:
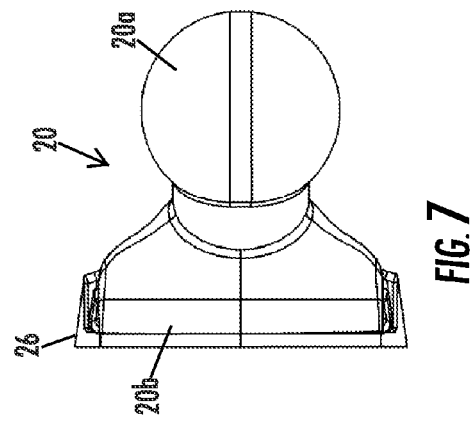
FIG. 7 is an end elevation of the mounting base and mounting adapter configuration of FIG. 6.
Figure 8A:
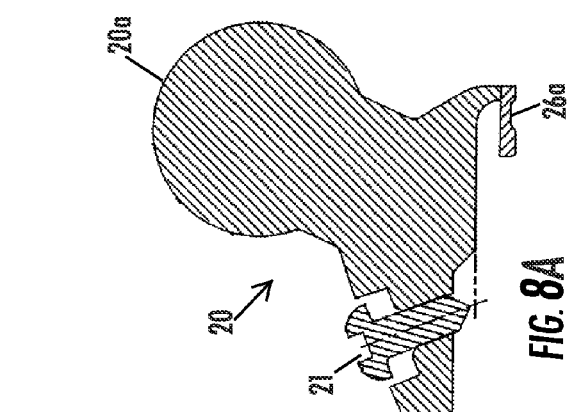
FIG. 8A is a sectional view of the mounting base and mounting adapter configuration taken along the line A-A in FIG. 8.
Figure 8:
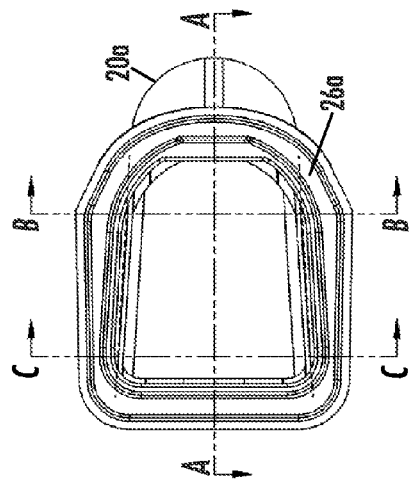
FIG. 8 is a lower plan view of the mounting base and mounting adapter configuration of FIGS. 6 and 7.
Figure 8C:
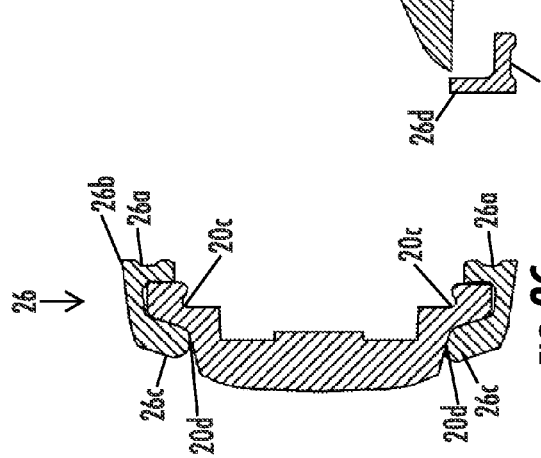
FIG. 8C is a sectional view of the mounting base and mounting adapter configuration taken along the line C-C in FIG. 8.
Figure 8B:
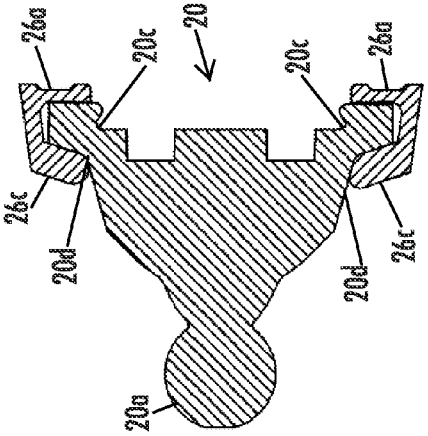
FIG. 8B is a sectional view of the mounting base and mounting adapter configuration taken along the line B-B in FIG. 8.
Figure 10:
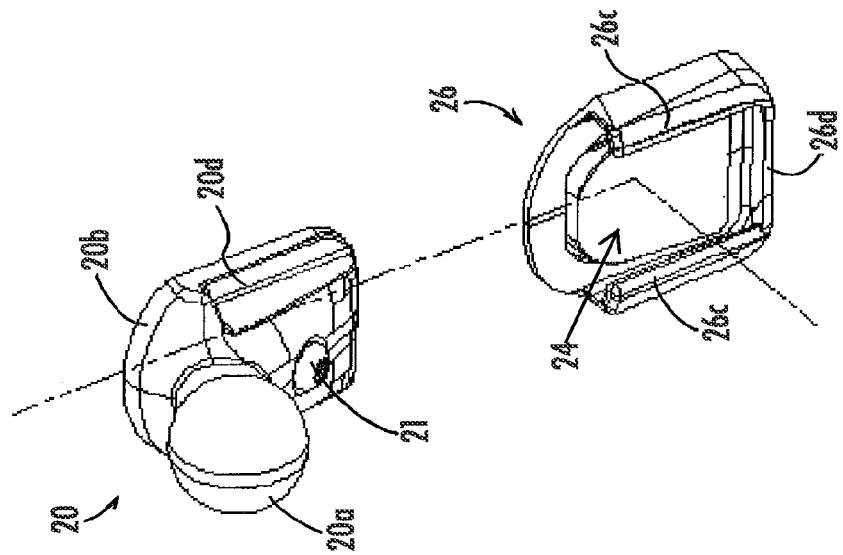
FIG. 10 is another exploded perspective view similar to FIG. 9, but with the mounting adapter disposed around the mounting button in accordance with the present invention.
Figure 9:
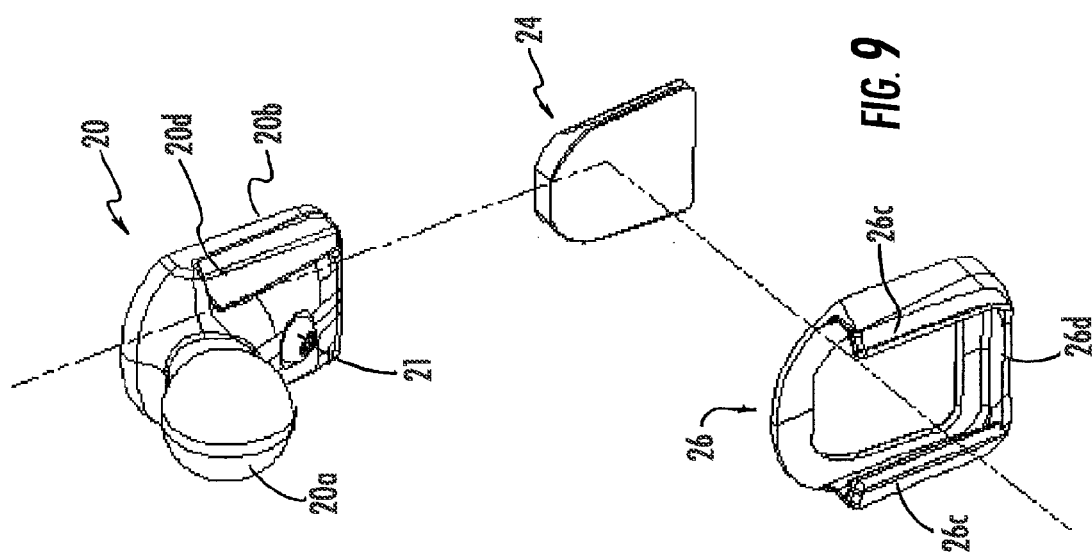
FIG. 9 is an exploded perspective view of the mounting adapter and mounting button and mounting base in accordance with the present invention.
Figure 12:
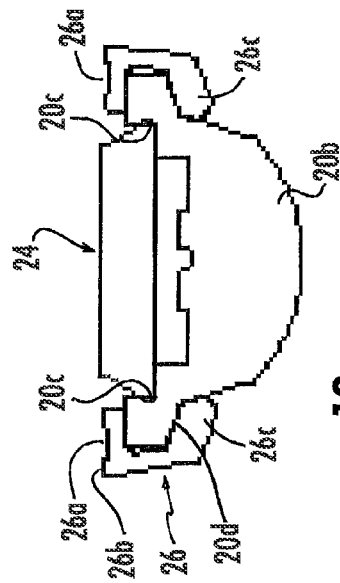
FIG. 12 is a sectional view of the configuration of FIG. 11.

In the illustrated embodiment, mounting base 20 comprises ball portion or member 20a and attachment portion 20b, which is configured to attach to mirror mounting button 24 and adapter 26. As shown in FIGS. 6-8, attachment portion 20b includes a recess or button receiving portion or channel 20c that is formed along the windshield facing surface or portion of attachment portion 20b of mounting base 20 to slidably receive the side regions of button 24 therein (such as in a known manner). Attachment portion 20b also includes a pair of recesses or channels 20d established at its outer surface (away from the windshield and mounting button), with the channels 20d formed or configured to receive the side arms or tabs 26c therealong as mounting base 20 is attached to adapter 26 (and as mounting base 20 is partially received in adapter 26 while mounting base 20 at least partially receives mounting button 24 therein). Mounting base 20 includes a fastener 21 that is configured to engage mounting button 24 when mounting base 20 is attached to mounting button 24 and adapter 26, in order to limit or substantially preclude sliding of mounting base 20 relative to mounting button 24 and adapter 26 (such as in a manner similar to known fasteners for retaining known mounting bases to mounting buttons).

Thus, the present invention provides for a button adapter that enhances or increases the size of the bonding area between the mirror mounting button and the windshield. Thus, for example, if a mirror assembly (such as a base line or lower content mirror assembly) of a vehicle were replaced with a larger and/or heavier mirror assembly (such as an electrochromic or higher content mirror assembly), the mounting base could be removed from the conventional mirror mounting button (such as by loosening the fastener and sliding the mounting base along and off of the mounting button in a known manner) and an adapter of the present invention could be adhered or bonded to the windshield surface at and around the mounting button (see FIGS. 9 and 10). A mounting base of the present invention may then be slid over and along the mounting button and into and along the adapter (see FIGS. 11-14), whereby the fastener 21 may be tightened or adjusted to retain the mounting base at the appropriate position relative to the mounting button and adapter. The mounting base and adapter and mounting button configuration may function to hold the adapter in place at the windshield surface after the adapter is adhered to the in-cabin surface of the windshield and while the adhesive cures. This is due to the pressure applied toward the windshield and against the adapter by the mounting base when it is slid along and receives the mounting button in the channel or channels at the windshield facing surface or portion of the mounting base.

Figure 14:
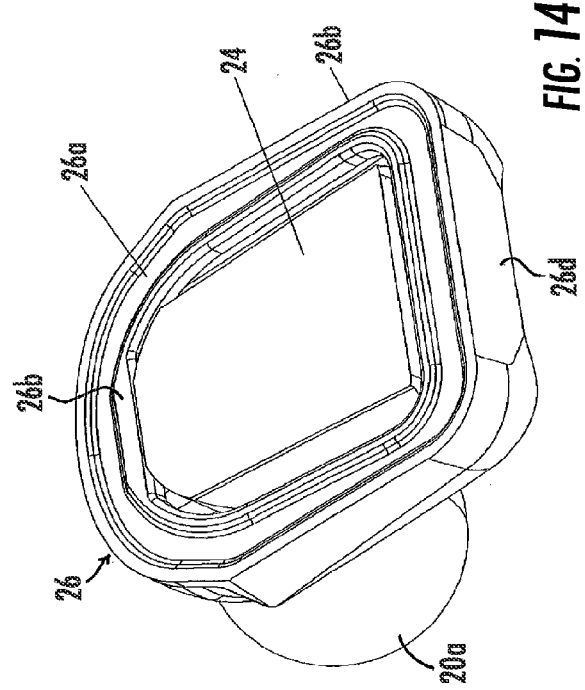
FIG. 14 is another perspective view of the mounting base attached to the mounting button and mounting base in accordance with the present invention.
Figure 11:
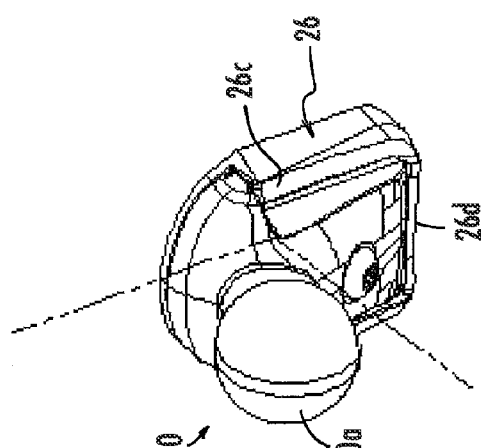
FIG. 11 is a perspective view of the mounting base attached to the mounting button and mounting base in accordance with the present invention.
Figure 13:
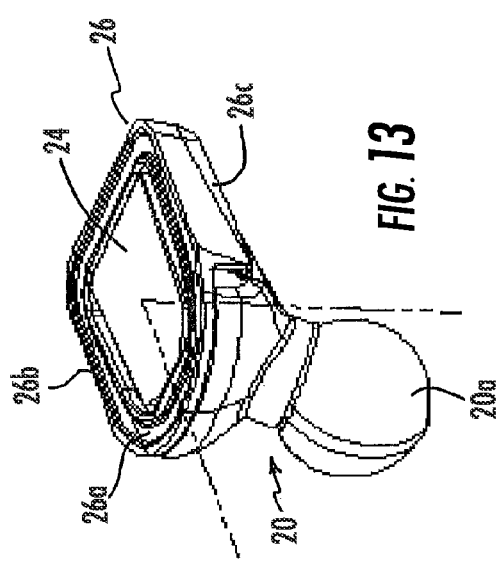
FIG. 13 is another perspective view of the mounting base attached to the mounting button and mounting base in accordance with the present invention.

When so attached, the mounting base is attached to the mounting button and adapter configuration that provides a larger bonding surface area at the windshield surface, such that the mounting base may be used in association with a larger or heavier mirror assembly, without requiring removal and replacement of the mounting button previously attached to or bonded to the windshield surface. For example, and as shown in FIG. 14, the mounting button may provide a bonding area of around 5.5 $cm^2$ to about 6 $cm^2$ (such as, for example, about 5.6535 $cm^2$), while the adapter may provide a bonding area of around 6.5 $cm^2$ to about 7 $cm^2$ (such as, for example, about 6.6986 $cm^2$). Clearly, however, other sized adapters may be used with other sized mounting buttons while remaining within the spirit and scope of the present invention. Thus, the adapter of the present invention may increase the bonding area of the mirror attachment structure by more than about double that of the mounting button alone. Thus, the bond strength at the mounting elements/buttons is substantially increased by the addition of the adapter and thus the size and/or weight of the mirror assembly that is supported by the mounting elements is increased to allow for additional mirror content to be provided at a previously attached smaller mounting button.

Thus, the present invention provides a mounting system, such as a die cast zinc mounting system, designed to increase the payload of a common interior mounting button or element already mounted on a windshield. The device uses an adaptor casting, a modified windshield channel mount and an epoxy adhesive to reinforce and add overall bonding area of a mirror mounting system or accessory mounting system to a windshield. Since the adaptor is placed on the assembly after the initial button is in place as an accessory, it is intended to be glued on, such as with an epoxy adhesive. The adapter is adhered to the in-cabin surface of the windshield and the modified channel mount or mounting base may be attached or mounted at the mounting button-adapter combination (even before the adhesive that adheres or bonds the adapter to the windshield is cured), whereby the modified channel mount holds the adapter in place using the original button as a clamping device while the epoxy adhesive cures. The rails on the channel mount combined with the dovetail features on the adapter clamp the channel mount and adapter in place at the mounting button when the channel mount is slid into place along the mounting button and adapter. The grooves on the bottom or windshield facing surface or portion of the adapter provide for a minimum or desired epoxy thickness or bond line thickness for the finished cured state of the bonding adhesive disposed around the adapter. While a smaller mounting button may handle an increased payload (such as due to a highly contented mirror supported by the mounting button) for a limited time, fatigue and failure may occur over time and heat exposure. However, there is enough durability in the original mounting button to hold the adapter in place until the adhesive bonding the adapter to the windshield is fully cured. The cured system increases the overall effective mounting button or mounting element bonding area at the windshield, such as, for example, by more than double that of the original smaller mounting button itself.

Optionally, it is envisioned that the mounting adapter may include or incorporate one or more accessories therein or thereat or thereon, whereby one or more accessories may be provided at the adapter while one or more other accessories may be provided at the new or replacement mirror assembly and/or accessory module and/or the like. The adapter or mounting system thus may integrate one or more options or accessories or the like in the mounting system. For example, the adapter may have a collision sensor or compass element or the like attached thereto or incorporated therein, or a ring-shaped adapter element may be formed at or established at a windshield facing portion of an accessory or the like, so that a customer may swap out the adapter and associated accessory as desired or needed, depending on the particular application of the mounting system or adapter of the present invention. Optionally, it is envisioned that the adapter ring may be formed or established on or at a windshield facing portion of a module or mounting structure, whereby the original interior assembly (which may be mounted at the windshield by a mounting button or the like) may be replaced with an assembly that already includes the adapter attached thereto or established thereat, with the replacement interior assembly sliding into place at the mounting button (or otherwise engaging the mounting button and windshield) and adhering to the in-cabin surface of the windshield so that the adapter and button cooperate to support the replacement interior assembly, while remaining within the spirit and scope of the present invention.

Although shown and described as a mounting adapter that is adhered to the in-cabin surface of the windshield at and/or at least partially around the existing mounting button at the windshield, with the mounting base engaging both the mounting button and adapter when mounted thereat, clearly other means for enhancing the support at the mounting button (such as for aftermarket applications) may be implemented, while remaining within the spirit and scope of the present invention. For example, a mounting adapter of the present invention may be connected to the mounting button (such as via sliding engagement of the mounting button in a channel formed in the adapter or otherwise mechanically joined or connected to the mounting button) and adhered to the in-cabin surface of the windshield at or around or partially around the mounting button, whereby the mounting base may engage only the adapter (such as via sliding engagement or snap engagement or the like), with the adapter and mounting button cooperating to provide a greater bonding surface area at the windshield to enhance the support of the mounting base at the windshield. Optionally, the mounting adapter may otherwise be attached at the windshield and mounting button, such as via mechanical attachment, depending on the particular application of the adapter. Optionally, the mounting adapter may be attached or adhered at or to the mounting button, and may rest against the in-cabin surface of the windshield, whereby the mounting adapter effectively provides enhanced support at the windshield without being directly bonded to the windshield surface. The mounting adapter thus may attach to the mounting button and may function to dissipate the load at the mounting button and mounting adapter so that the windshield itself acts as a rest or surface against which the mounting adapter may be urged when the mounting base is attached to the mounting adapter and/or mounting button. Optionally, in such an application, the windshield contacting surface of the mounting adapter may have a resilient feature, such as a rubber or foam layer or the like, which may engage the in-cabin surface of the windshield when the mounting adapter is attached at or to the mounting button.

Therefore, the present invention provides an adapter to enhance or increase the bonding area of a mirror mounting element(s) at the in-cabin surface of a vehicle windshield, without requiring removal of an OEM windshield mounted mirror mounting button. The adapter may be readily adhered or bonded to the in-cabin surface of the windshield at and/or around the previously attached mounting button. The mounting base that mounts to the mounting button and adapter is configured to slide over and along both the mounting button and adapter and to be retained relative to the windshield via engagement with both the mounting button and adapter. The mounting button and adapter thus cooperate to support the mirror mounting base and mirror assembly at the vehicle windshield, whereby the mirror assembly and/or mirror mounting base may be larger and/or heavier and/or have enhanced or increased electronic content relative to a mirror assembly and/or mirror mounting base that may have been supported by only the mounting button itself.

Thus, the present invention allows for a vehicle mirror manufacturer to create and market upgrade or enhanced content mirror assemblies and/or accessories to add on or replace mirror assemblies (such as baseline or prismatic, reduced content mirror assemblies) already installed in vehicles, such as for an aftermarket application. For example, an enhanced content prismatic mirror assembly could be offered to replace a base prismatic mirror assembly on a vehicle. Prior to the present invention such replacements or add-ons would raise concerns about the mass on older or any vehicle with small wedge type mirror mounting buttons and their ability to withstand the load of a heavier, highly contented mirror without falling off or having severe image stability issues. The present invention adds to the effective size of the mirror mounting button, thereby increasing the load bearing capabilities of the existing mirror mounting button, whereby the larger and/or heavier increased content mirror assembly or accessory or accessory module may be supported at and by the mirror mounting button and adapter, and thus avoid having to remove the originally mounted mirror mounting button adhered to the vehicle windshield, such as at the windshield manufacturer or vehicle manufacturer.

Optionally, the mirror assembly may include a circuit element (such as a printed circuit board or the like) with circuitry established thereat for powering and/or controlling one or more electronic features or accessories associated with the mirror assembly. In the illustrated embodiment, the reflective element comprises an electro-optic mirror reflective element, such as an electrochromic mirror reflective element or cell (having a front substrate and a rear substrate with an electrochromic medium established therebetween, and with conductive coatings at the surfaces of the substrates facing the electrochromic medium, such as utilizing known aspects of electrochromic reflective elements and/or aspects of the electro-optic reflective elements discussed below), and the circuit element may include terminals or connectors for electrically connecting to electrode clips or the like at the conductive surfaces of the reflective element via electrically conductive wires or leads, such as in a known manner or such as by utilizing aspects of the mirror assemblies described in U.S. Pat. Nos. 7,274,501; 7,255,451; 7,195,381; 7,184,190; 5,668,663; 5,724,187 and/or 6,690,268, and/or U.S. patent application Ser. No. 11/226,628, filed Sep. 14, 2005 and published Mar. 23, 2006 as U.S. Publication No. US-2006-0061008; Ser. No. 10/538,724, filed Jun. 13, 2005 and published Mar. 9, 2006 as U.S. Publication No. US-2006-0050018; Ser. No. 12/578,732, filed Oct. 14, 2009 and published Apr. 22, 2010 as U.S. Publication No. US-2010-0097469; and/or Ser. No. 12/576,550, filed Oct. 12, 2009, now U.S. Pat. No. 8,465,161, and/or PCT Application No. PCT/US2010/029173, filed Mar. 30, 2010 and published Oct. 7, 2010 as International Publication No. WO2010/114825, and/or PCT Application No. PCT/US03/29776, filed Sep. 9, 2003 by Donnelly Corp. et al. for MIRROR REFLECTIVE ELEMENT ASSEMBLY, and published Apr. 1, 2004 as International Publication No. WO 2004/026633, which are all hereby incorporated herein by reference in their entireties.

Optionally, the mirror assembly may comprise an electro-optic or electrochromic mirror assembly and may include an electro-optic or electrochromic reflective element. The electrochromic mirror element of the electrochromic mirror assembly may utilize the principles disclosed in commonly assigned U.S. Pat. Nos. 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712,879, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Washington (1990), which are hereby incorporated by reference herein in their entireties; and/or as described in U.S. Pat. No. 7,195,381, which is hereby incorporated herein by reference in its entirety. Optionally, the electrochromic circuitry and/or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly. The mirror assembly may include one or more other displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 7,274,501; 7,255,451; 7,195,381; 7,184,190; 5,668,663; 5,724,187 and/or 6,690,268, and/or in U.S. patent application Ser. No. 11/226,628, filed Sep. 14, 2005; and/or Ser. No. 10/538,724, filed Jun. 13, 2005, and/or PCT Application No. PCT/US03/29776, filed Sep. 9, 2003 by Donnelly Corp. et al. for MIRROR REFLECTIVE ELEMENT ASSEMBLY, and published Apr. 1, 2004 as International Publication No. WO 2004/026633, which are all hereby incorporated herein by reference in their entireties. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854; 6,420,036; and/or 7,274,501, and in PCT Application No. PCT/US03/29776, filed Sep. 9, 2003 by Donnelly Corp. et al. for MIRROR REFLECTIVE ELEMENT ASSEMBLY, and published Apr. 1, 2004 as International Publication No. WO 2004/026633, which are all hereby incorporated herein by reference in their entireties.

Optionally, the interior rearview mirror assembly may comprise a prismatic mirror assembly or a non-electro-optic mirror assembly or an electro-optic or electrochromic mirror assembly. For example, the interior rearview mirror assembly may comprise a prismatic mirror assembly, such as the types described in U.S. Pat. Nos. 7,249,860; 6,318,870; 6,598,980; 5,327,288; 4,948,242; 4,826,289; 4,436,371; and 4,435,042; and PCT Application No. PCT/US2004/015424, filed May 18, 2004 by Donnelly Corporation et al. for MIRROR ASSEMBLY FOR VEHICLE, and published on Dec. 2, 2004, as International Publication No. WO 2004/103772, which are hereby incorporated by reference in their entireties. Optionally, the prismatic reflective element may comprise a conventional prismatic reflective element or prism or may comprise a prismatic reflective element of the types described in U.S. Pat. Nos. 7,420,756; 7,274,501; 7,249,860; 7,338,177; and/or 7,255,451, and/or PCT Application No. PCT/US03/29776, filed Sep. 19, 2003 by Donnelly Corp, et al. for MIRROR REFLECTIVE ELEMENT ASSEMBLY, and published Apr. 1, 2004 as International Publication No. WO 2004/026633; and/or PCT Application No. PCT/US2004/015424, filed May 18, 2004 by Donnelly Corporation et al. for MIRROR ASSEMBLY FOR VEHICLE, and published on Dec. 2, 2004, as International Publication No. WO 2004/103772, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319; and 6,315,421 (the entire disclosures of which are hereby incorporated by reference herein), that can benefit from the present invention.

Optionally, the mirror assemblies and mounting assemblies of the present invention may be utilized with an accessory module or windshield electronics module or the like, and the mirror assembly may mount to the module (such as to a mirror mounting button at the rear surface of the accessory module). The accessory module or windshield electronics module may utilize aspects of the modules described in U.S. Pat. Nos. 7,538,316; 7,446,650; 7,188,963; 7,004,593; 6,824,281; 6,774,356; 6,690,268; 6,250,148; 6,341,523; 6,593,565; 6,428,172; 6,501,387; 6,329,925; and 6,326,613, and/or in PCT Application No. PCT/US03/40611, filed Dec. 19, 2003 by Donnelly Corp. et al. for ACCESSORY SYSTEM FOR VEHICLE, and published Jul. 15, 2004 as International Publication No. WO 2004/058540, and/or Ireland pat. applications, Ser. No. S2004/0614, filed Sep. 15, 2004; Ser. No. S2004/0838, filed Dec. 14, 2004; and Ser. No. S2004/0840, filed Dec. 15, 2004, which are all hereby incorporated herein by reference in their entireties.

Optionally, the mirror assembly may include user interface inputs, such as buttons or switches or touch or proximity sensors or the like, with which a user may adjust one or more characteristics of the imaging sensor and/or imaging system, such as via the principles described in U.S. patent application Ser. No. 12/091,525, filed Apr. 25, 2008, now U.S. Pat. No. 7,855,755; and/or Ser. No. 11/239,980, filed Sep. 30, 2005, now U.S. Pat. No. 7,881,496, and/or U.S. provisional application Ser. No. 60/618,686, filed Oct. 14, 2004, which are hereby incorporated herein by reference in their entireties. Optionally, the images captured by the imaging sensor or camera may be processed by the control to extract information or data for different applications or systems, such as described in U.S. patent application Ser. No. 11/239,980, filed Sep. 30, 2005, now U.S. Pat. No. 7,881,496, and/or U.S. provisional application Ser. No. 60/618,686, filed Oct. 14, 2004, which are hereby incorporated herein by reference in their entireties.

The interior rearview mirror assembly may include a bezel portion and casing, such as described above, or the mirror assembly may comprise other types of casings or bezel portions or the like, such as described in U.S. Pat. Nos. 7,249,860; 6,439,755; 4,826,289; and 6,501,387; and/or PCT Application No. PCT/US2004/015424, filed May 18, 2004 by Donnelly Corp. et al. for MIRROR ASSEMBLY FOR VEHICLE, and published on Dec. 2, 2004, as International Publication No. WO 2004/103772; and/or U.S. patent application Ser. No. 10/993,302, filed Nov. 19, 2004, now U.S. Pat. No. 7,338,177; and/or Ser. No. 12/576,550, filed Oct. 12, 2009, now U.S. Pat. No. 8,465,161, which are all hereby incorporated herein by reference in their entireties, without affecting the scope of the present invention. For example, the mirror assembly may comprise a flush or frameless or bezel-less reflective element, such as the types described in U.S. Pat. Nos. 7,360,932; 7,255,451; 7,274,501; and/or 7,184,190, and/or in U.S. Des. Pat. Nos. D633,423; D633,019; D638,761, and/or in PCT Application No. PCT/US2004/015424, filed May 18, 2004 by Donnelly Corp. et al. for MIRROR ASSEMBLY FOR VEHICLE, and published on Dec. 2, 2004, as International Publication No. WO 2004/103772; PCT Application No. PCT/US03/35381, filed Nov. 5, 2003 by Donnelly Corp. et al. for ELECTRO-OPTIC REFLECTIVE ELEMENT ASSEMBLY, and published May 21, 2004 as International Publication No. WO 2004/042457; PCT Application No. PCT/US10/32017, filed Apr. 22, 2010 and published Oct. 28, 2010 as International Publication No. WO 2010/124064; and/or PCT Application No. PCT/US10/51741, filed Oct. 7, 2010 and published Apr. 14, 2011 as International Publication No. WO 2011/044312, and/or in U.S. patent application Ser. No. 11/226,628, filed Sep. 14, 2005 and published Mar. 23, 2006 as U.S. Publication No. US-2006-0061008; Ser. No. 11/912,576, filed Oct. 25, 2005, now U.S. Pat. No. 7,626,749; and/or Ser. No. 10/538,724, filed Jun. 13, 2005 and published Mar. 9, 2006 as U.S. Publication No. US-2006-0050018; and/or Ser. No. 12/912,253, filed Oct. 26, 2010, now U.S. Pat. No. 8,851,690, which are all hereby incorporated herein by reference in their entireties.

Optionally, the mirror assembly may comprise a modular mirror construction, and may include back housing portions or the like, such as cap portions of the types described in PCT Application No. PCT/US2004/015424, filed May 18, 2004 by Donnelly Corporation et al. for MIRROR ASSEMBLY FOR VEHICLE, and published on Dec. 2, 2004, as International Publication No. WO 2004/103772, which is hereby incorporated herein by reference in its entirety. Optionally, a display screen may be provided as a modular display screen and may be mountable or installable in the appropriate or suitable mirror casing to provide a modular mirror assembly and display screen. For example, a rear casing or cap portion may include the display screen module including the associated components, such as the rails and motor and the like, and may be attachable to a reflective element and/or bezel portion to assemble the modular mirror assembly. The display screen module thus may be provided as an optional component or accessory for a vehicle, and may be readily assembled to a common reflective element and/or bezel portion of the mirror assembly.

Optionally, the mirror casing and/or reflective element may include customized or personalized viewable characteristics, such as color or symbols or indicia selected by the vehicle manufacturer or owner of the vehicle, such as the customization characteristics described in PCT Application No. PCT/US2004/015424, filed May 18, 2004 by Donnelly Corporation et al. for MIRROR ASSEMBLY FOR VEHICLE, and published on Dec. 2, 2004, as International Publication No. WO 2004/103772; and/or U.S. patent application Ser. No. 11/912,576, filed Oct. 25, 2005, now U.S. Pat. No. 7,626,749; Ser. No. 11/243,783, filed Oct. 5, 2005; Ser. No. 11/021,065, filed Dec. 23, 2004, now U.S. Pat. No. 7,255,451; and/or Ser. No. 11/243,783, filed Oct. 5, 2005, and published Apr. 20, 2006 as U.S. Publication No. 2006/0082192, which are hereby incorporated herein by reference in their entireties. For example, the frame or casing of the display module and/or the mirror assembly may be selected to have a desired color or combination of colors (or text or print or indicia thereon) to personalize the appearance of the mirror assembly. Optionally, the reflective element may include text or symbols or icons or other characters or indicia to provide a desired appearance or message at the mirror assembly or display screen, such as by utilizing aspects of the mirror assembly described in PCT Application No. PCT/US2004/015424, filed May 18, 2004 by Donnelly Corporation et al. for MIRROR ASSEMBLY FOR VEHICLE, and published on Dec. 2, 2004, as International Publication No. WO 2004/103772; and/or U.S. patent application Ser. No. 11/912,576, filed Oct. 25, 2005, now U.S. Pat. No. 7,626,749; Ser. No. 11/243,783, filed Oct. 5, 2005, which are hereby incorporated herein by reference in their entireties. The icons or characters or indicia may be formed at or near or on the display screen, or may be provided via graphic overlays when the display screen is extended and operating, or may otherwise be formed or provided at or on or in the display screen casing or frame, without affecting the scope of the present invention. Optionally, the bezel or frame color or colors may be selected to be designer colors or may match or contrast the color of the mirror casing, and/or may have logos or icons or other indicia thereon. Optionally, the display screen module may include warnings or other statements or alerts or messages printed or otherwise formed on the bezel or frame portion of the display screen so that the messages or the like are readily viewable when the display screen is extended.

Optionally, the mirror assembly and/or prismatic or electrochromic reflective element may include one or more displays, such as for the accessories or circuitry described herein. The displays may be of types disclosed in U.S. Pat. Nos. 5,530,240 and/or 6,329,925, which are hereby incorporated herein by reference in their entireties, and/or may be display-on-demand or transflective type displays, such as the types disclosed in U.S. Pat. Nos. 7,581,859; 7,195,381;

6,690,298; 5,668,663 and/or 5,724,187, and/or in U.S. patent application Ser. No. 11/226,628, filed Sep. 14, 2005 and published Mar. 23, 2006 as U.S. Publication No. US-2006-0061008; Ser. No. 10/993,302, filed Nov. 19, 2004, now U.S. Pat. No. 7,338,177; and/or Ser. No. 12/091,525, filed Apr. 25, 2008, now U.S. Pat. No. 7,855,755, and/or in PCT Application No. PCT/US03/29776, filed Sep. 19, 2003 by Donnelly Corp. et al. for MIRROR REFLECTIVE ELEMENT ASSEMBLY, and published Apr. 1, 2004 as International Publication No. WO 2004/026633, which are all hereby incorporated herein by reference in their entireties. Optionally, a prismatic reflective element may comprise a display on demand or transflective prismatic element (such as described in PCT Application No. PCT/US03/29776, filed Sep. 19, 2003 by Donnelly Corp. et al. for MIRROR REFLECTIVE ELEMENT ASSEMBLY, and published Apr. 1, 2004 as International Publication No. WO 2004/026633; and/or U.S. patent application Ser. No. 10/993,302, filed Nov. 19, 2004, now U.S. Pat. No. 7,338,177, which are all hereby incorporated herein by reference in their entireties) so that the displays are viewable through the reflective element, while the display area still functions to substantially reflect light, in order to provide a generally uniform prismatic reflective element even in the areas that have display elements positioned behind the reflective element.

Such a video display screen device or module may comprise any type of video screen and is operable to display images in response to an input or signal from a control or imaging system. For example, the video display screen may comprise a multi-pixel liquid crystal module (LCM) or liquid crystal display (LCD), preferably a thin film transistor (TFT) multi-pixel liquid crystal display (such as discussed below), or the screen may comprise a multi-pixel organic electroluminescent display or a multi-pixel light emitting diode (LED), such as an organic light emitting diode (OLED) or inorganic light emitting diode display or the like, or a passive reflective and/or backlit pixelated display, or an electroluminescent (EL) display, or a vacuum fluorescent (VF) display or the like. For example, the video display screen may comprise a video screen of the types disclosed in U.S. Pat. Nos. 7,370,983; 7,338,177; 7,274,501; 7,255,451; 7,195,381; 7,184,190; 6,902,284; 6,690,268; 6,428,172; 6,420,975; 5,668,663; 5,724,187; 5,416,313; 5,285,060; 5,193,029 and/or 4,793,690, and/or U.S. patent application Ser. No. 10/538,724, filed Jun. 13, 2005 and published Mar. 9, 2006 as U.S. Publication No. US-2006-0050018; Ser. No. 11/226,628, filed Sep. 14, 2005 and published Mar. 23, 2006 as U.S. Publication No. US-2006-0061008; Ser. No. 12/091,525, filed Apr. 25, 2008, now U.S. Pat. No. 7,855,755; Ser. No. 09/585,379, filed Jun. 1, 2000; Ser. No. 10/207,291, filed Jul. 29, 2002; and/or Ser. No. 10/538,724, filed Jun. 13, 2005, which are hereby incorporated herein by reference in their entireties.

The video display screen may be controlled or operable in response to an input or signal, such as a signal received from one or more cameras or image sensors of the vehicle, such as a video camera or sensor, such as a CMOS imaging array sensor, a CCD sensor or the like, such as the types disclosed in U.S. Pat. Nos. 5,550,677; 5,760,962; 6,396,397; 6,097,023; 5,877,897; and 5,796,094, and/or U.S. patent application Ser. No. 10/534,632, filed May 11, 2005, which are hereby incorporated herein by reference in their entireties, or from one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle.

Optionally, the mirror assembly and/or mounting structure may include a forward facing imaging sensor or camera that may be mounted at a circuit element or substrate supported at the mirror assembly or mounting base or the like. The camera may include a sensor chip or imager chip or sensing element established at the circuit board or element, with a lens barrel extending from the chip in the direction of the forward field of view of the sensor. Such cameras are typically used in the likes of automatic headlamp control, lane departure warnings systems, traffic sign recognition systems and/or the like (such as by utilizing aspects of the vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and/or 6,824,281, which are all hereby incorporated herein by reference in their entireties). Optionally, it is envisioned that the mirror assembly and/or mounting assembly may support any suitable or appropriate or selected sensor or accessory, such as a radar sensor, a photosensor, a lidar sensor or the like, while remaining within the spirit and scope of the present invention. Optionally, for example, the sensor may utilize aspects of the sensors and/or systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454; and/or 6,824,281, and/or PCT Application No. PCT/US08/51833, filed Jan. 24, 2008 and published Oct. 23, 2008 as International Publication No. WO 2008/127752, and/or PCT Application No. PCT/US2010/25545, filed Feb. 26, 2010 and published Sep. 2, 2010 as International Publication No. WO 2010/099416, which are all hereby incorporated herein by reference in their entireties.

Optionally, the mirror assembly may include or may be associated with a compass sensor and circuitry for a compass system that detects and displays the vehicle directional heading to a driver of the vehicle. Optionally, an integrated automotive "compass-on-a-chip" may be disposed in a cavity of the mounting base of the mirror (or within the mirror housing or in an attachment to the mirror mount or elsewhere within the mirror assembly such as to the rear of the video screen or to the rear of the mirror reflective element) and may comprise at least two magneto-responsive sensor elements (such as a Hall sensor or multiple Hall sensors), associated A/D and D/A converters, associated microprocessor(s) and memory, associated signal processing and filtering, associated display driver and associated LIN/CAN BUS interface and the like, all (or a sub-set thereof) created or disposed or commonly established onto a semiconductor chip surface/substrate or silicon substrate, such as utilizing CMOS technology and/or fabrication techniques as known in the semiconductor manufacturing arts, and constituting an ASIC chip, such as utilizing principles described in U.S. Pat. Nos. 7,329,013 and/or 7,370, 983, and/or U.S. patent application Ser. No. 11/226,628, filed Sep. 14, 2005 and published Mar. 23, 2006 as U.S. Publication No. US-2006-0061008, which are hereby incorporated herein by reference in their entireties, which are hereby incorporated herein by reference in their entireties, and/or such as by utilizing aspects of an EC driver-on-a-chip such as described in U.S. patent application Ser. No. 11/201,661, filed Aug. 11, 2005 by DeWard et al. for ACCESSORY MODULE FOR VEHICLE, now U.S. Pat. No. 7,480,149, which is hereby incorporated herein by reference in its entirety. The ASIC chip may be small (preferably less than approximately a two square centimeter area, more preferably less than approximately a 1.5 square centimeter area, and most preferably less than approximately a one square centimeter area or thereabouts) and readily packagable into the mirror assembly (or a feed from such a compass-on-a-chip may be provided to the mirror assembly from a compass-on-a-chip packaged elsewhere in the vehicle cabin remote from the mirror assembly such as in an instrument panel portion or in roof console portion). Such large scale integration onto the likes of the silicon substrate/chip can allow a compass functionality to be provided by a relatively small chip, and with appropriate pin out or electrical leads provided as is common in the electrical art.

Optionally, a compass chip or compass module may be disposed at an upper end of the mounting base of a mirror assembly, such as at an upper or connecting end of a wire management element connected to or extending from the mounting base of the mirror assembly, such as by utilizing aspects of the mirror systems described in U.S. patent application Ser. No. 12/578,732, filed Oct. 14, 2009 and published Apr. 22, 2010 as U.S. Publication No. US-2010-0097469, which is hereby incorporated herein by reference in its entirety. The wire management system may include a wire management element or channel or cover element, such as by utilizing aspects of the wire management systems or elements described in U.S. patent application Ser. No. 11/226,628, filed Sep. 14, 2005 and published Mar. 23, 2006 as U.S. Publication No. US-2006-0061008; and/or Ser. No. 11/584,697, filed Oct. 20, 2006, now U.S. Pat. No. 7,510,287, which are hereby incorporated herein by reference in their entireties.

The compass chip may be in communication with a compass display, which may provide a display region at the reflective element, and which includes ports or portions, which may comprise icons, characters or letters or the like representative of only the cardinal directional points, such as, for example, the characters N, S, E, W, formed or etched in the reflective film coating of the reflective element (and forming a transparent window therein), such as via techniques such as disclosed in commonly assigned U.S. Pat. Nos. 4,882,565 and/or 7,004,593, which are hereby incorporated by reference herein in their entireties. Optionally, however, reflective element may comprise a transflective or display on demand (DOD) reflective element, and the compass display may be a display on demand (DOD) type of display, such as disclosed in commonly assigned U.S. Pat. Nos. 7,195,381; 6,690,268; 5,668,663 and 5,724,187, which are hereby incorporated by reference herein in their entireties, without affecting the scope of the present invention.

Optionally, the compass system and compass circuitry may utilize aspects of the compass systems described in U.S. Pat. Nos. 7,370,983; 7,329,013; 7,249,860; 7,004,593; 6,928,366; 6,642,851; 6,140,933; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; and/or 6,513,252, and/or PCT Application No. PCT/US2004/015424, filed May 18, 2004 by Donnelly Corp. et al. for MIRROR ASSEMBLY FOR VEHICLE, and published on Dec. 2, 2004, as International Publication No. WO 2004/103772, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. The compass circuitry may include compass sensors, such as a magneto-responsive sensor, such as a magneto-resistive sensor, a magneto-capacitive sensor, a Hall sensor, a magneto-inductive sensor, a flux-gate sensor or the like. The sensor or sensors may be positioned at and within a base portion or mounting base of the mirror assembly so that the sensor/sensors is/are substantially fixedly positioned within the vehicle, or may be attached or positioned within the mirror casing. Note that the magneto-responsive sensor used with the mirror assembly may comprise a magneto-responsive sensor, such as a magneto-resistive sensor, such as the types disclosed in U.S. Pat. Nos. 5,255,442; 5,632,092; 5,802,727; 6,173,501; 6,427,349; and 6,513,252 (which are hereby incorporated herein by reference in their entireties), or a magneto-inductive sensor, such as described in U.S. Pat. No. 5,878,370 (which is hereby incorporated herein by reference in its entirety), or a magneto-impedance sensor, such as the types described in PCT Publication No. WO 2004/076971 A2, published Sep. 10, 2004 (which is hereby incorporated herein by reference in its entirety), or a Hall-effect sensor, such as the types described in U.S. Pat. Nos. 6,278,271; 5,942,895 and 6,184,679 (which are hereby incorporated herein by reference in their entireties). The sensor circuitry and/or the circuitry in the mirror housing and associated with the sensor may include processing circuitry. For example, a printed circuit board may include processing circuitry which may include compensation methods, such as those described in U.S. Pat. Nos. 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; and 6,642,851, which are all hereby incorporated herein by reference in their entireties. The compass sensor may be incorporated in or associated with a compass system and/or display system for displaying a directional heading of the vehicle to the driver, such as a compass system of the types described in U.S. Pat. Nos. 5,924,212; 4,862,594; 4,937,945; 5,131,154; 5,255,442; 5,632,092; and/or 7,004,593, and/or PCT Application No. PCT/US2004/015424, filed May 18, 2004 by Donnelly Corp. et al. for MIRROR ASSEMBLY FOR VEHICLE, and published on Dec. 2, 2004, as International Publication No. WO 2004/103772, which are all hereby incorporated herein by reference in their entireties.

Optionally, the mirror assembly and/or any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle (which may be incorporated at or associated with the mounting assembly and/or mirror assembly), such as an accessory module or console of the types described in U.S. Pat. Nos. 6,877,888; 6,824,281; 6,690,268; 6,672,744; 6,386,742; and 6,124,886, and/or, and/or PCT Application No. PCT/US03/03012, filed Jan. 31, 2003 by Donnelly Corporation for VEHICLE ACCESSORY MODULE, and published Aug. 7, 2003 as International Publication No. WO 03/065084, and/or PCT Application No. PCT/US03/40611, filed Dec. 19, 2003 by Donnelly Corporation for ACCESSORY SYSTEM FOR VEHICLE, and published Jul. 15, 2004 as International Publication No. WO 2004/058540, and/or PCT Application No. PCT/US04/15424, filed May 18, 2004 by Donnelly Corporation et al. for MIRROR ASSEMBLY FOR VEHICLE, and published on Dec. 2, 2004, as International Publication No. WO 2004/103772, which are hereby incorporated herein by reference in their entireties.

Optionally, the user inputs of the mirror assembly may comprise any suitable types of buttons or switches for controlling or activating/deactivating one or more electrical accessories or devices of or associated with the mirror assembly. The mirror assembly may comprise any type of switches or buttons, such as touch or proximity sensing switches, such as touch or proximity switches of the types described above, or the inputs may comprise other types of buttons or switches, such as those described in U.S. Pat. Nos. 7,527,403; 7,360,932 and/or 7,253,723; and/or U.S. patent application Ser. No. 12/576,550, filed Oct. 12, 2009, now U.S. Pat. No. 8,465,161, which are hereby incorporated herein by reference in their entireties, or such as fabric-made position detectors, such as those described in U.S. Pat. Nos. 6,504,531; 6,501,465; 6,492,980; 6,452,479; 6,437,258; and 6,369,804, which are hereby incorporated herein by reference in their entireties. For example, the inputs may comprise a touch or proximity sensor of the types commercially available from TouchSensor Technologies, LLC of Wheaton, Ill. The touch or proximity sensor may be operable to generate an electric field and to detect the presence of a conductive mass entering the field. When a voltage is applied to the sensor, the sensor generates the electric field, which emanates through any dielectric material, such as plastic or the like, at the sensor. When a conductive mass (such as a person's finger or the like, or metal or the like) enters the electric field, the sensor may detect a change in the field and may indicate such a detection. Other types of switches or buttons or inputs or sensors may be incorporated to provide the desired function, without affecting the scope of the present invention.

Optionally, the user inputs or buttons may comprise user inputs for a garage door opening system, such as a vehicle based garage door opening system of the types described in U.S. Pat. Nos. 6,396,408; 6,362,771; 7,023,322; and 5,798,688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; and 6,420,975; 6,477,464; 6,946,978; 7,308,341; 7,167,796; 7,004,593; and/or 6,678,614, and/or PCT Application No. PCT/US03/40611, filed Dec. 19, 2003 by Donnelly Corporation et al. for ACCESSORY SYSTEM FOR VEHICLE, and published Jul. 15, 2004 as International Publication No. WO 2004/058540, and/or PCT Application No. PCT/US03/308877, filed Oct. 1, 2003 by Donnelly Corp. for MICROPHONE SYSTEM FOR VEHICLE, and published Apr. 15, 2004 as International Publication No. WO 2004/032568, which are all hereby incorporated herein by reference in their entireties.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775; and/or 7,249,860, microphones, such as disclosed in U.S. Pat. Nos. 6,243,003; 6,278,377; and/or 6,420,975; and/or U.S. patent application Ser. No. 10/529,715, filed Mar. 30, 2005; and/or PCT Application No. PCT/US03/30877, filed Oct. 1, 2003, and published Apr. 15, 2004 as International Publication No. WO 2004/032568, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 5,929,786 and/or 5,786,772, and/or U.S. patent application Ser. No. 10/427,051, filed Apr. 30, 2003, now U.S. Pat. No. 7,038,577; Ser. No. 10/209,173, filed Jul. 31, 2002, now U.S. Pat. No. 6,882,287; and/or Ser. No. 11/315,675, filed Dec. 22, 2005, now U.S. Pat. No. 7,720,580, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,526,103; 7,400,435; 6,690,268 and 6,847,487; and/or U.S. provisional application Ser. No. 60/618,686, filed Oct. 14, 2004, and/or U.S. patent application Ser. No. 11/239,980, filed Sep. 30, 2005, now U.S. Pat. No. 7,881,496, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205; and/or 7,423,522, and/or an ONSTAR® system, a compass, such as disclosed in U.S. Pat. Nos. 5,924,212; 4,862,594; 4,937,945; 5,131,154; 5,255,442; and/or 5,632,092, and/or any other accessory or circuitry or the like (with all of the above-referenced patents and PCT and U.S. patent applications being commonly assigned to Donnelly Corporation, and with the disclosures of the referenced patents and patent applications being hereby incorporated herein by reference in their entireties).

Optionally, the mirror assembly (such as at the mounting base, which may be fixed relative to the vehicle windshield) may include an imaging sensor (such as a forward facing imaging sensor or camera that has a forward field of view through the vehicle windshield) that may be part of or may provide an image output for a vehicle vision system, such as a headlamp control system or lane departure warning system or object detection system or other vehicle vision system or the like, and may utilize aspects of various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,038,577; and 7,004,606; and/or U.S. patent application Ser. No. 11/315,675, filed Dec. 22, 2005 and published Aug. 17, 2006 as U.S. Patent Publication No. US-2006-0184297A1; Ser. No. 10/534,632, filed May 11, 2005 and published Aug. 3, 2006 as U.S. Patent Publication No. US-2006-0171704-A1; Ser. No. 12/091,359, filed Jun. 10, 2008; and/or Ser. No. 12/377,054, filed Feb. 10, 2009; and/or PCT Application No. PCT/US2006/041709 filed Oct. 27, 2006, published May 10, 2007 as PCT Publication No. WO 07/053404; and/or PCT Application No. PCT/US2007/75702, filed Aug. 10, 2007, published Feb. 28, 2008 as PCT Publication No. WO 08/024639, which are all hereby incorporated herein by reference in their entireties. The sensor may include a lens element or optic between the imaging plane of the imaging sensor and the forward scene to substantially focus the scene at an image plane of the imaging sensor. The imaging sensor may comprise an image sensing module or the like, and may utilize aspects described in U.S. patent application Ser. No. 10/534,632, filed May 11, 2005; and/or PCT Application No. PCT/US2006/041709, filed Oct. 27, 2006 and published May 10, 2007 as International Publication No. WO 07/053404; and/or PCT Application No. PCT/US2003/036177 filed Nov. 14, 2003 and published Jun. 3, 2004 as PCT Publication No. WO 2004/047421, which are hereby incorporated herein by reference in their entireties.

Optionally, the accessory or accessories, such as those described above and/or below, may be positioned at or within the mirror casing and may be included on or integrated in a printed circuit board positioned within the mirror casing, such as along a rear surface of the reflective element or elsewhere within a cavity defined by the casing, without affecting the scope of the present invention. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Changes and modifications in the specifically described embodiments may be carried out without departing from the principles of the present invention, which is intended to be limited only by the scope of the appended claims as interpreted according to the principles of patent law.

The invention claimed is:

1. An interior mounting system for a vehicle, said interior mounting system comprising:
   an interior assembly;
   a mounting assembly for mounting said interior assembly at a windshield of a vehicle that is equipped with said interior assembly;
   a first windshield mounting element adhered to an in-cabin surface of the windshield of the equipped vehicle;
   a second windshield mounting element attached at the in-cabin surface of the windshield of the equipped vehicle and at or at least partially around said first windshield mounting element;
   wherein said mounting assembly comprises a mounting base, and wherein said interior assembly is supported at the windshield by said mounting base;
   wherein said mounting base is configured to engage at least said second windshield mounting element when said mounting base is mounted at said first and second windshield mounting elements at the in-cabin surface of the windshield of the equipped vehicle; and
   wherein said first and second windshield mounting elements cooperate to support said mounting base and said interior assembly when said first and second windshield mounting elements are adhered to the in-cabin surface of the windshield of the equipped vehicle and when said mounting base is mounted at said first and second windshield mounting elements.

2. The interior mounting system of claim 1, wherein said mounting base is configured to engage both of said first and second windshield mounting elements when said mounting base is mounted at said first and second windshield mounting elements at the in-cabin surface of the windshield of the equipped vehicle.

3. The interior mounting system of claim 1, wherein said second windshield mounting element is adhered at the in-cabin surface of the windshield of the equipped vehicle and at least partially around said first windshield mounting element.

4. The interior mounting system of claim 1, wherein said first windshield mounting element comprises a mounting button and wherein said second windshield mounting element comprises a ring-shaped mounting element that at least partially circumscribes said mounting button.

5. The interior mounting system of claim 4, wherein said mounting base includes at least one first channel for receiving at least a portion of said mounting button and at least one second channel for receiving a portion of said ring-shaped mounting element.

6. The interior mounting system of claim 5, wherein said at least one first channel is formed along a windshield facing portion of said mounting base that faces the windshield of the equipped vehicle when said mounting base is mounted at the windshield of the equipped vehicle.

7. The interior mounting system of claim 6, wherein said at least one second channel is formed along an outer portion of said mounting base that faces away from the windshield of the equipped vehicle when said mounting base is mounted at the windshield of the equipped vehicle.

8. The interior mounting system of claim 1, wherein said interior assembly comprises an interior rearview mirror assembly comprising a mirror casing and a reflective element disposed at said mirror casing.

9. The interior mounting system of claim 8, wherein said mirror casing is supported at the windshield by said mounting base and is pivotable relative to said mounting base.

10. An interior rearview mirror mounting system for a vehicle, said interior rearview mirror mounting system comprising:
- an interior rearview mirror assembly;
- a mounting assembly for mounting said interior rearview mirror assembly at a windshield of a vehicle that is equipped with said interior rearview mirror assembly;
- a first windshield mounting element adhered to an in-cabin surface of the windshield of the equipped vehicle;
- a second windshield mounting element attached at the in-cabin surface of the windshield of the equipped vehicle and at said first windshield mounting element, wherein said second windshield mounting element comprises a ring-shaped mounting element that at least partially circumscribes said first windshield mounting element;
- wherein said mounting assembly comprises a mounting base, and wherein said interior rearview mirror assembly is supported at the windshield by said mounting base;
- wherein said mounting base is configured to engage at least said second windshield mounting element when said mounting base is mounted at said first and second windshield mounting elements at the in-cabin surface of the windshield of the equipped vehicle; and
- wherein said first and second windshield mounting elements cooperate to support said mounting base and said interior rearview mirror assembly when said first and second windshield mounting elements are adhered to the in-cabin surface of the windshield of the equipped vehicle and when said mounting base is mounted at said first and second windshield mounting elements.

11. The interior rearview mirror mounting system of claim 10, wherein said mounting base includes at least one first channel for receiving at least a portion of said first windshield mounting element and at least one second channel for receiving a portion of said second windshield mounting element.

* * * * *